US006874358B2

(12) United States Patent
Wolber et al.

(10) Patent No.: US 6,874,358 B2
(45) Date of Patent: Apr. 5, 2005

(54) METHOD FOR DETERMINING A HOT-START SITUATION IN AN INTERNAL COMBUSTION ENGINE

(75) Inventors: Jens Wolber, Gerlingen (DE); Gerd Grass, Schwiederbingen (DE); Ruediger Weiss, Moetzingen (DE); Edmund Schaut, Friolzheim (DE); Bernd Roos, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/362,638

(22) PCT Filed: Aug. 7, 2001

(86) PCT No.: PCT/DE01/03021

§ 371 (c)(1), (2), (4) Date: Feb. 25, 2003

(87) PCT Pub. No.: WO02/20966

PCT Pub. Date: Mar. 14, 2002

(65) Prior Publication Data

US 2004/0015288 A1 Jan. 22, 2004

(30) Foreign Application Priority Data

Sep. 4, 2000 (DE) ........................................ 100 43 695

(51) Int. Cl.[7] ............................................... G01M 15/00
(52) U.S. Cl. ....................................... 73/117.2; 374/144
(58) Field of Search ................................ 73/116, 117.2, 73/117.3, 118.1; 374/100, 101, 102, 110, 112, 141, 144

(56) References Cited

U.S. PATENT DOCUMENTS

| | | | | |
|---|---|---|---|---|
| 4,224,913 A | | 9/1980 | Barnard | |
| 4,723,523 A | | 2/1988 | Kataoka et al. | |
| 4,747,386 A | | 5/1988 | Onishi | |
| 4,951,633 A | * | 8/1990 | Achleitner et al. | 123/491 |
| 5,327,872 A | | 7/1994 | Morikawa | |
| 6,732,025 B2 | * | 5/2004 | Reese et al. | 701/29 |
| 2002/0099482 A1 | * | 7/2002 | Reese et al. | 701/29 |
| 2004/0128059 A1 | * | 7/2004 | Kunz et al. | 701/114 |

FOREIGN PATENT DOCUMENTS

| | | |
|---|---|---|
| DE | 44 35 419 A | 4/1996 |
| EP | 0 365 714 A | 5/1990 |

OTHER PUBLICATIONS

Patent Abstracts of Japan. vol. 006, No. 039 (M0116), Mar. 10, 1982 & JP 56 154133 A, Nov. 28, 1981.

* cited by examiner

*Primary Examiner*—Eric S. McCall
(74) *Attorney, Agent, or Firm*—Michael J. Striker

(57) ABSTRACT

A method for detecting a hot start situation in an internal combustion of a motor vehicle includes the steps of determining a gradient of a temperature variation of an engine temperature; and detecting a hot start situation based on the determined gradient of a temperature variation of an engine temperature. An appropriate electronic control unit for an internal combustion engine is provided, as well as an appropriate computer program with a program code mechanism, and an appropriate computer program product with a program code mechanism.

14 Claims, 2 Drawing Sheets

METHOD FOR DETERMINING A HOT-START SITUATION IN AN INTERNAL COMBUSTION ENGINE

BACKGROUND OF THE INVENTION

The invention concerns a method for detecting a hot start situation in an internal combustion engine of a motor vehicle. The invention also concerns an appropriate electronic control unit for an internal combustion engine, an appropriate computer program with program code means, and an appropriate computer program product with program code means.

In general, a hot start situation exists, e.g., when an internal combustion engine that is still hot is restarted after a short pause in operation. When a hot machine is at rest, fuel vapor bubbles form in the fuel lines and in the injection valve itself. When said machine is then started, these fuel vapor bubbles inhibit regular fuel metering. For this reason, an extended injection signal is output under hot start conditions, so that a certain minimum amount of fuel can be provided to the combustion process even when fuel vapor bubbles occur. It is therefore necessary to determine when a hot start situation exists.

Publication DE 40 39 598 A1 discloses a hot start method and a hot start device for an internal combustion engine. According to the teaching disclosed in said publication, a hot start situation is assumed to exist when the engine temperature and the air intake temperature exceed certain threshold values and, moreover, the absolute-value difference between the air intake temperature at an earlier point in time and the air intake temperature during restart is above a selectable threshold.

Publication DE 44 35 419 A1 discloses a control system for the fuel metering of an internal combustion engine. In this case, a hot start situation is assumed to exist and an appropriate hot start bit is set when the temperature of the internal combustion engine exceeds an initial threshold and, in addition to this, the air intake temperature has increased by a certain amount since a last measurement. The last value can be the one that existed at the instant when the internal combustion engine was shut down, and the new value can have been obtained at the instant when the ignition or the starter was switched on. The hot start bit remains set until the internal combustion engine temperature exceeds a second threshold, or until a predetermined total air mass has flowed through the intake manifold. Said total air mass is detected by integrating the signal of an air mass sensor in the intake manifold.

In the case of modern fuel injection systems that operate with high-pressure fuel injection in particular, some components, e.g., the high-pressure pump, heat up substantially slower than the coolant of the internal combustion engine. It is therefore possible, after the internal combustion engine has been shut off, for the coolant temperature to have already dropped or to drop compared to the shut-off temperature, while the temperature of the high-pressure pump and other components is still high and/or increases even further.

SUMMARY OF THE INVENTION

The invention is based on the object of improving a method for detecting a hot start situation in an internal combustion engine of a motor vehicle, and for improving a control element. This object is attained by means of the features characterized in the independent claims. Advantageous and necessary embodiments and further developments of the invention are characterized in the dependent claims.

A method for determining a hot start situation in an internal combustion engine of a motor vehicle is developed further compared to the related art in that a hot start situation is detected at least based on a gradient and/or a temperature rise of a temperature variation of an engine temperature. By evaluating the temperature variation, a further temperature variation of the internal combustion engine can be diagnosed further in particularly advantageous fashion. The detection of a hot start situation is advantageously carried out based on the temperature variation between shut-off and restart of the internal combustion engine. The advantageous further development provides that the detection takes place during an electronic control unit tracking after the internal combustion engine is shut off. By means of this further development, a temperature variation of the internal combustion engine can be detected in a particularly reliable and technically simple fashion. The duration of the electronic control unit tracking must be selected so that is ensures that the temperature variation can be analyzed for an adequately long period of time. Advantageously, the engine temperature is detected based on a coolant temperature and/or an air intake temperature and/or a temperature of a temperature sensor in the engine compartment of the motor vehicle. It is particularly advantageous to evaluate the coolant temperature, i.e., usually the cooling water temperature, in particular, because the temperature can be detected by means of a temperature sensor that is located in the coolant circuit of the motor vehicle anyway, and an additional temperature sensor can therefore be eliminated.

A further development provides that, as further criteria for a hot start situation, at least the engine temperature and/or an air intake temperature must be greater than an applicable threshold. Due to this additional criterium, the reliability of the method according to the invention is markedly improved once more. It is also provided that, to detect a hot start situation, the gradient and/or the temperature rise of the temperature fluctuation of the engine temperature must be greater than an applicable threshold. By using applicable threshold values, the method according to the invention can be adapted in particularly advantageous fashion to various types of motor vehicles with different internal combustion engines. It can be adapted for use with diesel-powered as well as gasoline-powered internal combustion engines.

A particularly preferred further development provides that the dimensions of the applicable thresholds are designed to ensure that an elevated temperature of a high-pressure fuel pump located in the combustion chamber is detected. This embodiment is particularly advantageous in modern internal combustion engines with high-pressure fuel injection. An internal combustion engine with gasoline direct injection that is described in the exemplary embodiment of the invention is particularly worth mentioning here.

Another further development provides that an independent method for detecting a hot start situation is carried out simultaneously, and a hot start situation is detected when one of the two methods detects a hot start situation. A difference between an air intake temperature when the internal combustion engine is shut off and when it is started, and an engine temperature threshold can be used advantageously as the criterium in this case. A method such as this that is carried out in parallel can be performed using DE 44 35 419 A1 mentioned hereinabove, for example.

Another preferred further development is based on the fact that the temperature rise is the difference between the maximum temperature during the electronic control unit tracking and a shut-off temperature of the internal combustion engine, and that the gradient is calculated based on the temperature variation during the electronic control unit tracking. In this manner, the criteria for detecting a hot start that are relevant for evaluation purposes can be determined during electronic control unit tracking.

Of particular significance is the realization of the method, according to the invention, in the form of an electronic control unit for an internal combustion engine, in particular of a motor vehicle. Means for carrying out the steps of the method described hereinabove are provided.

Of particular significance, furthermore, are the realizations in the form of a computer program with program code means and in the form of a computer program product with program code means. The computer program according to the invention comprises program code means in order to carry out all steps of the method according to the invention when the program is run on a computer, in particular an electronic control unit for an internal combustion engine of a motor vehicle. In this case, the invention is therefore realized by means of a program stored in the electronic control unit, so that this electronic control unit equipped with the program represents the invention in the same fashion as the method, the execution of which the program is suited for. The computer program product according to the invention comprises program code means that are saved on a computer-readable data storage medium in order to carry out the method according to the invention when the program product is carried out on a computer, in particular an electronic control unit for an internal combustion engine of a motor vehicle. In this case, the invention is therefore realized by means of a data storage medium, so that the method according to the invention can be carried out when the program product and/or the data storage medium is integrated in an electronic control unit for an internal combustion engine of a motor vehicle, in particular. An electrical storage medium can be used in particular as data storage medium and/or as computer program product, e.g., a Read-Only-Memory (ROM), an EPROM, or an electrical, non-volatile memory such as a CD-ROM or a DVD.

Further features, possibilities for use and advantages of the invention result from the following description of exemplary embodiments of the invention that are shown in the figures below. All described or illustrated features—alone or in any combination—represent the object of the invention, independent of their summarization in the claims or their backward reference, and independent of their formulation and/or their depiction in the drawings.

BRIEF DESCRIPTION OF THE DRAWINGS

The invention will be explained hereinbelow with reference to an exemplary embodiment shown in the figures.

FIG. 1 shows an exemplary embodiment of the method according to the invention for detecting a hot start situation in an internal combustion engine of a motor vehicle. In a Step 101, the internal combustion engine of the motor vehicle is in a normal engine operating mode to start with. In other words: The motor vehicle and/or the internal combustion engine is running and a normal operating sequence is taking place. In Step 102, it is assumed that the driver of the motor vehicle intends to switch the internal combustion engine off. This can take place by turning the ignition key, for example. At this instant, the current engine shut-off temperature tmotab is saved in Step 102. In this exemplary embodiment, the engine shut-off temperature tmotab corresponds to the temperature of the cooling water temperature tmot determined by the cooling-water sensor. In Step 103, the engine and/or the internal combustion engine of the motor vehicle is shut off. In Step 104, according to the invention, the further cooling water temperature variation tmot is considered during electronic control unit tracking. To accomplish this, the maximum engine temperature tmotmax and the maximum gradient tmotgradmax of the engine temperature and/or, in this exemplary embodiment, of the cooling water temperature, is determined and stored, in Step 105 it is assumed that the drive of the motor vehicle wants to restart the internal combustion engine. To accomplish this, the electronic control unit of the internal combustion engine is initialized before the restart. After initialization of the electronic control unit before restart in Step 105, the temperature difference between the maximum engine temperature tmotmax during the electronic control unit tracking after the engine is shut off, and the engine shut-off temperature from Step 102 is first calculated in Step 106. Furthermore, a check is performed in Step 106 to determine if this temperature difference between tmotmax and tmotab is greater than an applicable, temperature-dependent threshold, or whether the maximum gradient of the engine temperature tmotgradmax determined during the electronic control unit tracking is greater than an applicable temperature-dependent threshold. If it is determined that none of the threshold values is exceeded, the process jumps to Step 107, in which a conventional hot start detection is carried out in addition. A conventional hot start detection of this nature can take place, for example, in analogous fashion to that described in the introduction to the description in DE 44 35 419 A1. If a hot start is not detected in Step 107 in this hot start detection, either, the process jumps to Step 108, in which it is determined once and for all that a hot start situation does not exist. In Step 109, the method according to the invention for determining a hot start situation is completed. The corresponding setting parameters of the internal combustion engine are changed depending on whether or not a hot start situation was detected.

If it was determined in Step 106 that one or two of the temperature-dependent threshold values was exceeded, the process jumps to Step 110. In Step 110, a check is now performed to determine if either the engine temperature and/or the air intake temperature exceed an applicable threshold value. If this is not the case, the process jumps to Step 108 and it is determined that a hot start situation does not exist. This is the case when, immediately after the motor vehicle is shut off, for example, a high maximum temperature value tmotmax and, therefore, a high temperature rise (tmotmax-tmotab) and/or a maximum temperature gradient of the engine temperature tmotgradmax is determined during the electronic control unit tracking, but the vehicle can subsequently cool down long enough for the engine temperature and the air intake temperature to fall below the predetermined threshold values.

If, on the other hand, it is determined in Step 110 that the engine temperature and/or the air intake temperature are above applicable threshold values, it is determined that a hot start situation exists and the procedure continues at Step 111. In Step 111, it is determined that a hot start situation exists. In this context, an appropriate hot start bit can be set in the electronic control unit, for example. In the next Step 109, the method, according to the invention, for determining a hot start situation ends, and the internal combustion engine is started with the appropriate parameters for a hot start situation.

DESCRIPTION OF THE PREFERRED EMBODIMENTS

If a hot start situation was detected in Step 107, the process jumps initially to Step 110 by comparing the engine temperature and air intake temperature values with corresponding threshold values. If it is thereby determined that the engine temperature and air intake temperature values are below applicable threshold values, a final decision is made in Step 108 that a hot start situation does not exist, despite the fact that a hot start situation was detected in Step 107.

Figure 1:
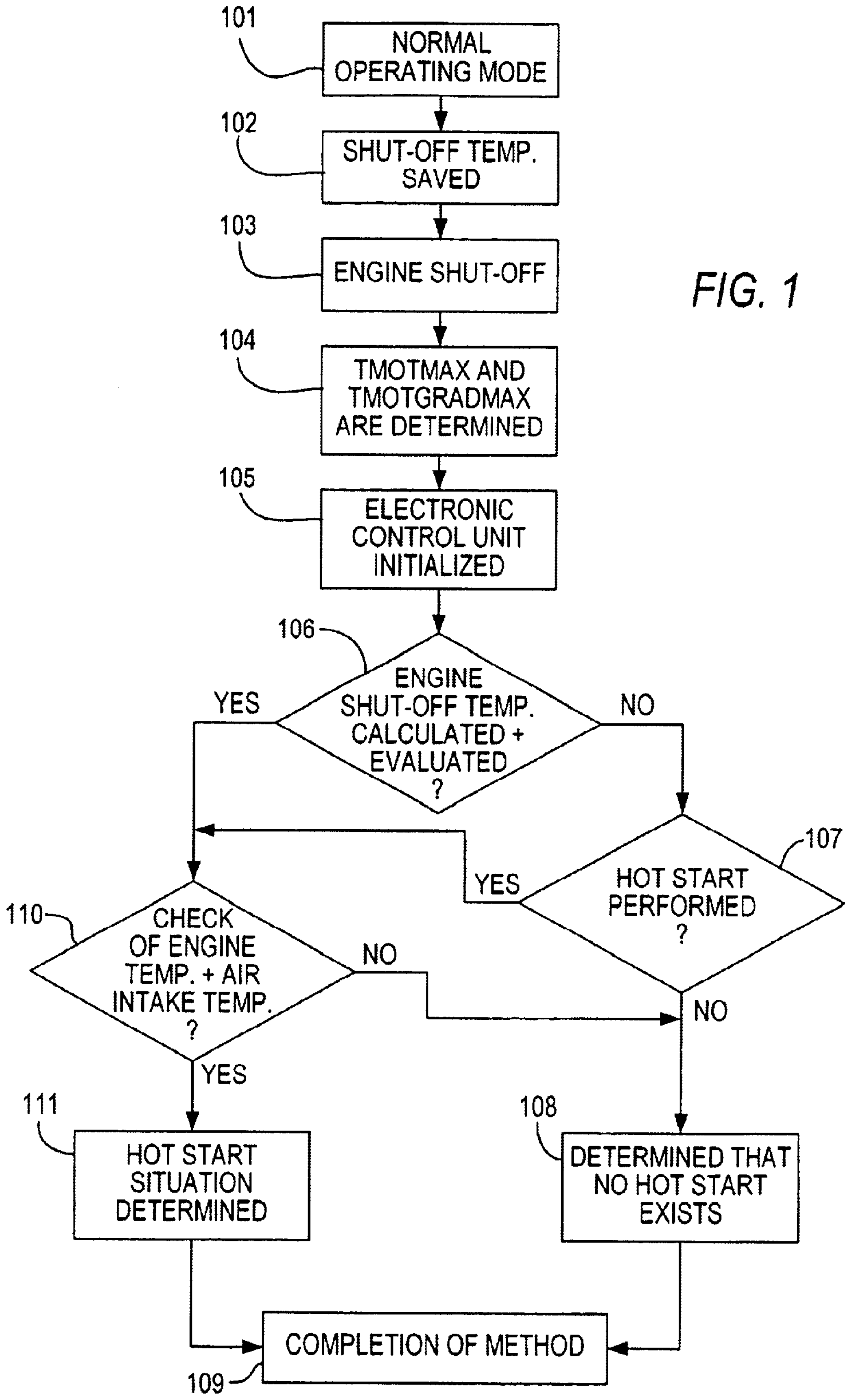
FIG. 1 shows an exemplary embodiment of the method according to the invention.
Figure 2:
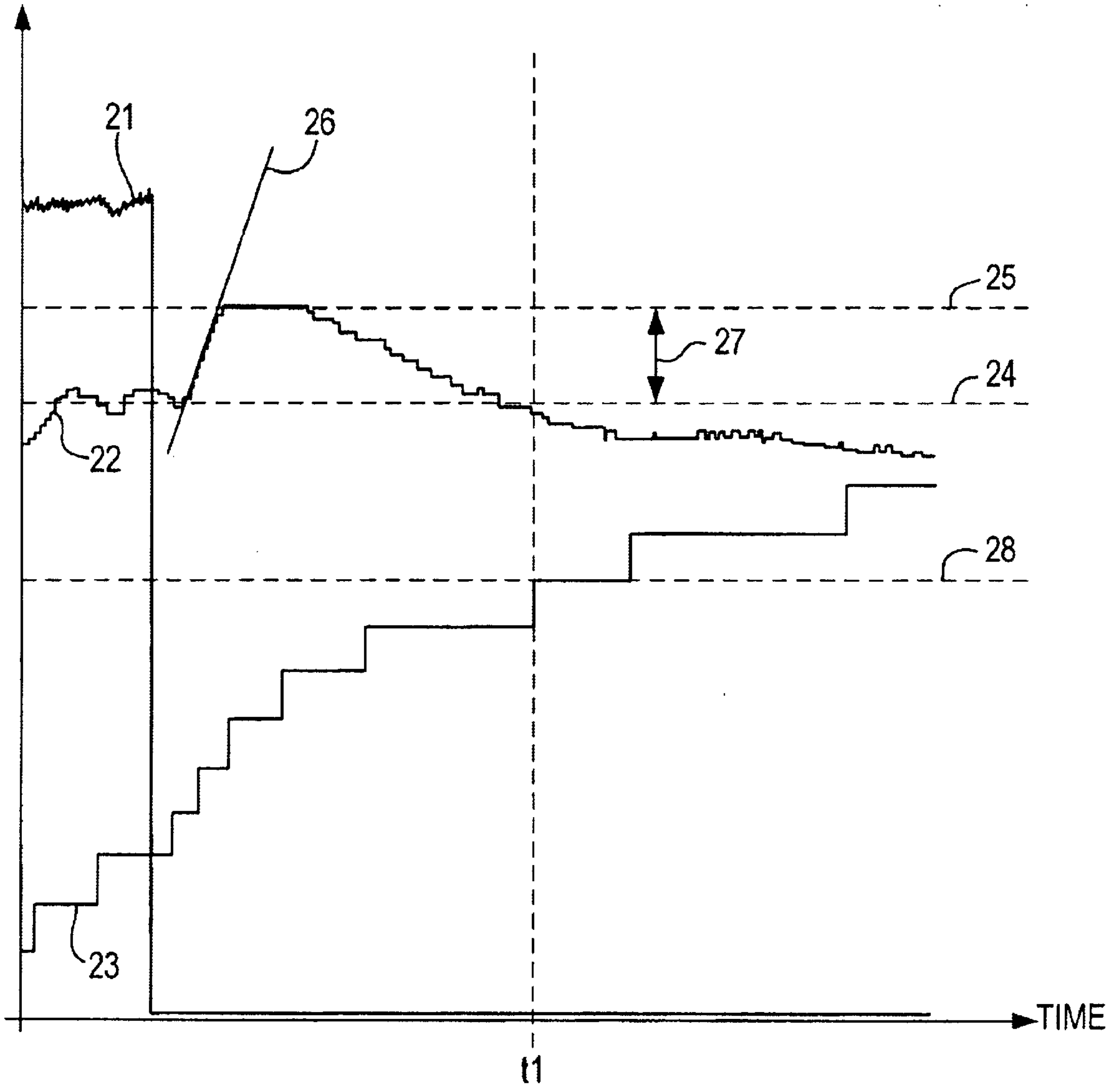
FIG. 2 shows an illustration of measured values when the method according to the invention is carried out.

FIG. 2 shows a depiction of measured values when the method according to the invention is carried out. FIG. 2 shows rotational speed and temperature data plotted over time. A characteristic 21 shows the rotational-speed variation nmot of an internal combustion engine. It is obvious that the rotational speed 21 drops sharply to 0 after a short period of time at a relatively high, constant rotational-speed value and then remains at 0. This instant when the rotational speed drops off sharply corresponds with the shutting-off of the internal combustion engine. The characteristic 22 represents the measured variation in cooling water temperature tmot of the internal combustion engine. Also shown in FIG. 2 is a characteristic 23 that corresponds to the measured temperature of a high-pressure pump in an internal combustion engine with gasoline direct injection. Also shown is the temperature threshold 24 that corresponds to the shut-off temperature tmotab of the internal combustion engine, and the temperature threshold 25 that corresponds to the maximum temperature tmotmax during the electronic control unit tracking.

It is obvious that the course of the cooling-water temperature 22 initially increases sharply to a maximum value 25 after the internal combustion engine is shut off, and then drops off steadily. The steep rise in the temperature variation of the cooling water temperature 22 that occurs during the electronic control unit tracking is approximated by a maximum temperature gradient tmotgradmax, shown as line 26. In addition, the maximum temperature rise 27 occurs between the shut-off temperature 24 (tmotab) and the maximum temperature during the electronic control unit tracking 25 (tmotmax). The method according to the invention for detecting a hot start situation is essentially based on the fact that a check is performed to determine whether the maximum temperature gradient 26 (tmotgradmax) or the maximum temperature rise 27 (tmotmax-tmotab) are above applicable threshold values.

The characteristic 23, which corresponds to the temperature of a high-pressure pump of a fuel supply system, shows clearly how the temperature of the high-pressure pump continues to increase after the motor vehicle is shut off. In theory, the temperature of the high-pressure pump 23 can climb to the temperature of the cooling water variation 23 at the maximum. As time progresses, it is obvious in FIG. 2 that the temperature variations 22 and 23 approach each other. Line 28 represents a temperature threshold that is a limit temperature of the high-pressure pump, at which a hot start situation is given for the high-pressure pump. In other words: Starting at this temperature threshold 28, the high-pressure pump reaches a temperature at which the internal combustion engine can no longer be properly supplied with fuel due to vapor bubbles forming in the fuel. Starting at instant t1, therefore, which is indicated by a vertical line, a hot start situation for the internal combustion engine with gasoline direct injection is given by the fact that the high-pressure pump has exceeded the hot start limit temperature for the high-pressure pump 28.

It is precisely this critical temperature rise of the high-pressure pump that can be detected according to the invention by means of the determined temperature gradient tmotgradmax and/or the determined maximum temperature rise (tmotmax-tmotab). Measurements have shown that a hot start situation—indicated by an overheated high-pressure pump—can be reliably determined using the method according to the invention.

The electronic control unit tracking required to carry out the method according to the invention takes approximately two minutes to move through the measured values shown in FIG. 2.

What is claimed is:

1. A method of detecting a hot start situation in an internal combustion engine of a motor vehicle, comprising the steps of determining a gradient of a temperature variation of an engine temperature; and detecting a hot start situation based on the determined gradient of a temperature variation of an engine temperature.

2. A method as defined in claim 1; and further comprising carrying out the detection based on the temperature variation between a shut-off and a renewed starting of the internal combustion engine.

3. A method as defined in claim 2; and further comprising carrying out the detection during an electronic control unit tracking after the internal combustion engine is shut down.

4. A method as defined in claim 1; and further comprising detecting an engine temperature based on a parameter selected from the group consisting of a coolant temperature, an intake air temperature, a temperature of a temperature sensor in an engine compartment of the motor vehicle, and a combination thereof.

5. A method as defined in claim 1; and further comprising using as a further criteria for a hot start situation at least one parameter selected from the group consisting of an engine temperature, an air intake temperature, and a combination thereof, which parameter must be greater than an applicable threshold.

6. A method as defined in claim 1; and further comprising using, to detect a hot start situation, using a parameters selected from the group consisting of an engine temperature, an air intake temperature, and a combination thereof, which parameter must be greater than an applicable threshold.

7. A method as defined in claim 1; and further comprising carrying out the detection of the hot start situation in a direct-injection gasoline-powered internal combustion engine.

8. A method as defined in claim 1; and further comprising carrying out an additional, independent method for detecting a hot start situation simultaneously; and detecting a hot start situation when one of the two methods detects a hot start situation.

9. A method as defined in claim 8, and further comprising detecting with the additional method a hot start situation at least based on a difference between intake temperature when the internal combustion engine is shut down and when the engine is started and based on an engine temperature threshold.

10. A method as defined in claim 3; and further comprising considering a temperature rise as a difference between a maximum temperature during an electronic control unit-tracking and a shut-off temperature of the internal combustion engine; and calculating the gradient based on the temperature variation during the electronic control unit-tracking.

11. An electronic control unit for an internal combustion engine of a motor vehicle for detecting a hot start situation in the internal combustion engine, comprising means for determining a gradient of a temperature variation of an engine temperature; and means for detecting a hot start situation at least based on the determined gradient of a temperature variation of an engine temperature.

12. A computer program with program code means to carry out a method of detecting a hot start situation in an internal combustion engine of a motor vehicle, comprising the steps of determining a gradient of a temperature variation of an engine temperature; and detecting a hot start situation based on the determined gradient of a temperature variation of an engine temperature, wherein the program is carried out on a computer in an electronic control unit for an internal combustion engine.

13. A computer program product with program code means that are stored on a computer-readable data storage medium to carry out a method of detecting a hot start situation in an internal combustion engine of a motor vehicle, comprising the steps of determining a gradient of a temperature variation of an engine temperature; and detecting a hot start situation based on the determined gradient of a temperature variation of an engine temperature, wherein the program is carried out on a computer in an electronic control unit for an internal combustion engine.

14. A method as defined in claim 1, wherein said detecting a hot start situation is based at least on a gradient and a temperature rise of a temperature variation of an engine temperature.

* * * * *